United States Patent [19]

Field

[11] Patent Number: 4,684,323

[45] Date of Patent: Aug. 4, 1987

[54] FILM COOLING PASSAGES WITH CURVED CORNERS

[75] Inventor: Robert E. Field, Tequesta, Fla.

[73] Assignee: United Technologies Corporation, Hartford, Conn.

[21] Appl. No.: 812,104

[22] Filed: Dec. 23, 1985

[51] Int. Cl.⁴ .............................................. F01D 5/18
[52] U.S. Cl. .................................. 416/97 R; 415/115
[58] Field of Search .......................... 416/97 R, 97 A; 415/115; 60/757

[56] References Cited

U.S. PATENT DOCUMENTS

| | | | |
|---|---|---|---|
| 1,857,509 | 5/1932 | Holmstrom . | |
| 2,149,510 | 3/1939 | Darrieus | 60/41 |
| 2,220,420 | 11/1940 | Meyer | 60/41 |
| 2,236,426 | 3/1941 | Faber | 60/41 |
| 2,477,583 | 8/1949 | De Zubay et al. | 60/44 |
| 2,489,683 | 11/1949 | Stalker | 60/41 |
| 3,098,148 | 7/1963 | Piot et al. | 219/69 |
| 3,303,645 | 2/1967 | Ishibashi | 60/39.65 |
| 3,447,318 | 6/1969 | Carvel et al. | 60/39.65 |
| 3,515,499 | 6/1970 | Beer et al. | 416/95 |
| 3,527,543 | 9/1970 | Howald | 416/90 |
| 3,594,536 | 7/1971 | Holroyd | 219/69 |
| 3,619,076 | 11/1971 | Kydd | 416/90 |
| 3,635,586 | 1/1972 | Keat et al. | 416/97 |
| 3,746,827 | 7/1973 | Martin et al. | 219/69 |
| 3,778,183 | 12/1973 | Luscher et al. | 415/115 |
| 3,799,696 | 3/1974 | Redman | 416/97 |
| 3,801,218 | 4/1974 | Moore | 416/97 A |
| 3,830,450 | 8/1974 | Williams et al. | 244/42 |
| 3,844,677 | 10/1974 | Evans | 416/84 |
| 3,889,903 | 6/1975 | Hilby | 244/42 |
| 3,915,106 | 10/1975 | De Witt | 114/66.5 |
| 3,921,271 | 11/1975 | Dennis et al. | 416/97 R |
| 3,995,422 | 12/1976 | Stamm | 60/39.66 |
| 4,142,824 | 3/1979 | Andersen | 415/115 |
| 4,162,136 | 7/1979 | Parkes | 416/97 |
| 4,168,938 | 9/1979 | Dodd | 416/97 |
| 4,197,443 | 4/1980 | Sidenstick | 219/69 |
| 4,214,722 | 7/1980 | Tamura | 244/208 |
| 4,267,698 | 5/1981 | Hartmann et al. | 60/756 |
| 4,303,374 | 12/1981 | Braddy | 416/97 R |
| 4,314,442 | 2/1982 | Rice | 60/39.05 |
| 4,384,823 | 5/1983 | Graham | 416/1 |
| 4,485,630 | 12/1984 | Kenworthy | 60/757 |
| 4,565,490 | 1/1986 | Rice | 415/115 X |

FOREIGN PATENT DOCUMENTS

| | | | |
|---|---|---|---|
| 599697 | 6/1960 | Canada | 416/97 R |
| 2840103 | 3/1979 | Fed. Rep. of Germany | 415/115 |
| 55-114806 | 9/1980 | Japan . | |
| 665155 | 1/1952 | United Kingdom . | |

OTHER PUBLICATIONS

Flight and Aircraft Engineer, No. 2460, vol. 69, (3-1-6-56) pp. 292-295.
Advances in Heat Transfer by Richard J. Goldstein, vol. 7, Academic Press (N.Y. 1971) The Monograph Film Cooling, pp. 321-379.
NASA Technical Paper 1546 Influence of Coolant Tube Curvature on Film Cooling Effectiveness as Detected by Infrared Imagery by S. Stephen Papell et al., 1979.

Primary Examiner—Everette A. Powell, Jr.
Attorney, Agent, or Firm—Stephen E. Revis

[57] ABSTRACT

A film cooling passage through the external wall of a hollow airfoil for a gas turbine engine has a metering section in series flow relation with a diffusing section leading to the passage outlet at the external surface of the airfoil over which a hot gas flows during operation. The diffusing section is generally rectangular in cross section perpendicular to the axis of the passage. Upstream and downstream longitudinally extending, spaced apart, facing surfaces of the diffusing section are joined together by a pair of spaced apart side walls which face each other and diverge from each other in the longitudinal direction toward the outlet of the passage. These side walls blend, along their length, with the downstream surface as a smooth curve of large radius. The diameter of the corner curvature of the passage is on the same order of magnitude as the distance between the upstream and downstream surfaces of the diffusing section at the location in question. The large corner curvatures, as opposed to filet radii, allow the side walls to diverge from each other at a greater angle without separation of the coolant fluid therefrom, permitting the spreading of smaller amounts of coolant air over a larger area of the airfoil external surface.

14 Claims, 20 Drawing Figures

FILM COOLING PASSAGES WITH CURVED CORNERS

The government has rights in this invention pursuant to Contract No. N00140-83-C-8897 awarded by the Department of the Navy.

TECHNICAL FIELD

This invention relates to film cooling, and more particularly to film cooled airfoils.

BACKGROUND ART

It is well known the external surface of airfoils may be cooled by conducting cooling air from an internal cavity to the external surface via a plurality of small passages. It is desired that the air exiting the passages remain entrained in the boundary layer on the surface of the airfoil for as long a distance as possible downstream of the passage to provide a protective film of cool air between the hot mainstream gas and the airfoil surface. The angle which the axis of the passage makes with the airfoil surface and its relation to the direction of hot gas flow over the airfoil surface at the passage breakout are important factors which influence film cooling effectiveness. Film cooling effectiveness E is defined as the difference between the temperature of the main gas stream ($T_g$) and the temperature of the coolant film ($T_f$) at a distance x downstream of the passage outlet, divided by the temperature difference between the temperature of the main gas stream and the coolant temperature ($T_c$) at the passage outlet (i.e., at x=0) thus, $E=(T_g-T_f)/(T_g-T_c)$. Film cooling effectiveness decreases rapidly with distance x from the passage outlet. Maintaining high film cooling effectiveness for as long a distance as possible over as large a surface area as possible is the main goal of airfoil film cooling.

It is well known in the art, that the engine airfoils must be cooled using a minimum amount of cooling air, since the cooling air is working fluid which has been extracted from the compressor and its loss from the gas flow path rapidly reduces engine efficiency. Airfoil designers are faced with the problem of cooling all the engine airfoils using a specified, maximum cooling fluid flow rate. The amount of fluid which flows through each individual cooling passage from an internal cavity into the gas path is controlled by the minimum cross-sectional area (metering area) of the cooling passage. The metering area is typically located where the passage intersects the internal cavity. The total of the metering areas for all the cooling passages and orifices leading from the airfoil controls the total flow rate of coolant from the airfoil, assuming internal and external pressures are fixed or at least beyond the designer's control. The designer has the job of specifying the passage size and the spacing between passages, as well as the shape and orientation of the passages, such that all areas of the airfoil are maintained below critical design temperature limits determined by the airfoil material capability, maximum stress, and life requirement considerations.

Ideally, it is desired to bathe 100% of the airfoil surface with a film of cooling air; however, the air leaving the passage exit generally forms a cooling film stripe no wider than or hardly wider than the dimension of the passage exit perpendicular to the gas flow. Limitations on the number, size, and spacing of cooling passages results in gaps in the protective film and/or areas of low film cooling effectiveness which may produce localized hot spots. Airfoil hot spots are one factor which limits the operating temperature of the engine.

U.S. Pat. No. 3,527,543 to Howald uses divergently tapered passages of circular cross section to increase the entrainment of coolant in the boundary layer from a given passage. The passages are also preferably oriented in a plane extending in the longitudinal direction or partially toward the gas flow direction to spread the coolant longitudinally upon its exit from the passage as it moves downstream. Despite these features, it has been determined by smoke flow visualization tests and engine hardware inspection that the longitudinal width of the coolant film from an eliptical passage breakout (i.e. Howald) continues to expand longitudinally only about a maximum of one passage exit minor diameter after the coolant is ejected on the airfoil surface. This fact, coupled with typical longitudinal spacing of three to six diameters between passages, result in areas of airfoil surface between and downstream of longitudinally spaced passages which receive no cooling fluid from that row of passages. Conical, angled passages as described in Howald U.S. Pat. No. 3,527,543 provide at best probably no more than 70% coverage (percentage of the distance between the centers of adjacent hole breakouts which is covered by coolant).

The velocity of the air leaving the cooling passage is dependent on the ratio of its pressure at the passage inlet to the pressure of the gas stream at the passage outlet. In general the higher the pressure ratio, the higher the exit velocity. Too high an exit velocity results in the cooling air penetrating into the gas stream and being carried away without providing effective film cooling. Too low a pressure ratio will result in gas stream ingestion into the cooling passage causing a complete loss of local airfoil cooling. Total loss of airfoil cooling usually has disastrous results, and because of this a margin of safety is usually maintained. This extra pressure for the safety margin drives the design toward the high pressure ratios. Tolerance of high pressure ratios is a desirable feature of film cooling designs. Diffusion of the cooling air flow by tapering the passage, as in the Howald patent discussed above is beneficial in providing this tolerance, but the narrow diffusion angles taught therein (12° maximum included angle) require long passages and, therefore, thick airfoil walls to obtain the reductions in exit velocities often deemed most desirable to reduce the sensitivity of the film cooling design to pressure ratio. The same limitation exists with respect to the trapezoidally shaped diffusion passages described in Sidenstick, U.S. Pat. No. 4,197,443. The maximum included diffusion angles taught therein in two mutually perpendicular planes are 7° and 14°, respectively, in order to assure that separation of the cooling fluid from the tapered walls does not occur and the cooling fluid entirely fills the passage as it exits into the hot gas stream. With such limits on the diffusing angles, only thicker airfoil walls and angling of the passages in the airfoil spanwise direction can produce wider passage outlets and smaller gaps between passages in the longitudinal direction. Wide diffusion angles would be preferred instead, but cannot be achieved using prior art teachings.

Figure 14:
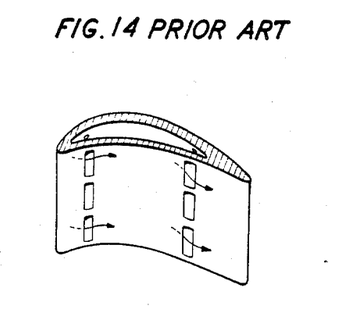
FIGS. 14 and 15 are reproductons of FIGS. 2 and 3, respectively, of prior art Japanese Patent No 55-114806.
Figure 15:
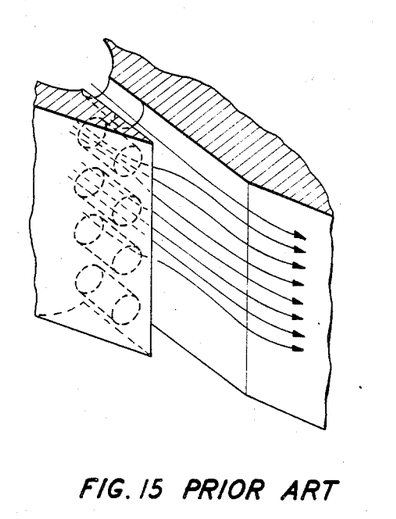
Figure 16:
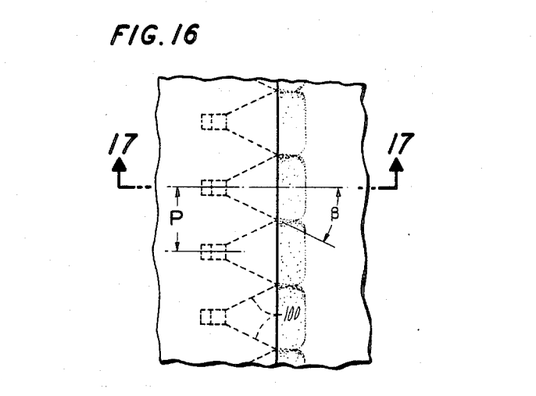
FIG. 16 is an enlarged view of the area B—B of FIG. 1.
Figure 17:
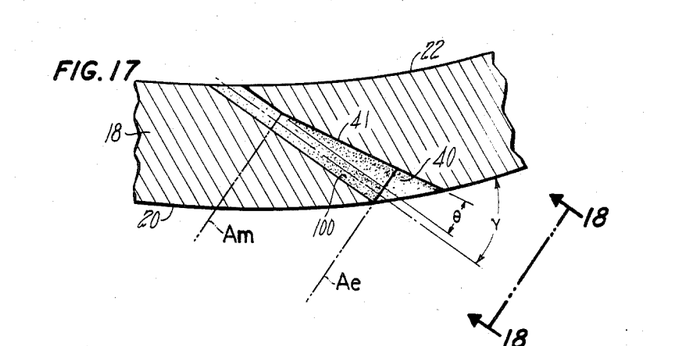
FIG. 17 is a sectional view taken along the line 17—17 of FIG. 16.
Figure 18:
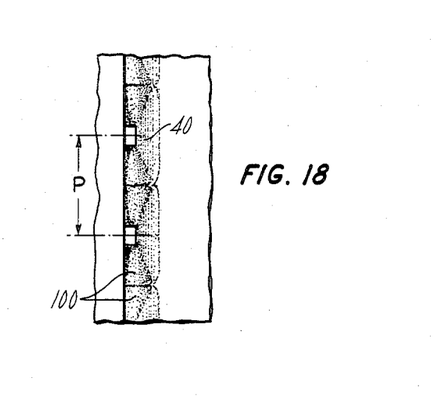
FIG. 18 is a sectional view taken along the line 18—18 of FIG. 17.

Japanese Pat. No. 55-114806 shows, in its FIGS. 2 and 3 (reproduced herein as prior art FIGS. 14 and 15), a hollow airfoil having straight cylindrical passages disposed in a longitudinal row and emptying into a longitudinally extending slot formed in the external surface of the airfoil. While that patent appears to teach that the flow of cooling fluid from adjacent passages blends to form a film of cooling fluid of uniform thickness over the full length of the slot by the time the cooling fluid exits the slot and reaches the airfoil surface, our test experience indicates that the coolant fluid from the cylindrical passages moves downstream as a stripe of essentially constant width, which is substantially the diameter of the passage. Any diffusion which results in blending of adjacent stripes of coolant fluid occurs so far downstream that film cooling effectiveness at that point is well below what is required for most airfoil designs.

U.S. Pat. No. 3,515,499 to Beer et al describes an airfoil made from a stack of etched wafers. The finished airfoil includes several areas having a plurality of longitudinally spaced apart passages leading from an internal cavity to a common, longitudinally extending slot from which the cooling air is said to issue to form a film of cooling air over the airfoil external surface. In FIG. 1 thereof each passage appears to converge from its inlet to a minimum cross-sectional area where it intersects the slot. In the alternate embodiment of FIG. 9, the passage appears to have a small, constant size which exits into a considerably wider slot. Both configurations are likely to have the same drawbacks as discussed with respect to the Japanese patent; that is, the cooling fluid will not uniformly fill the slot before it enters the main gas stream, and considerably less than 100% film coverage downstream of the slot is likely.

Other publications relating to film cooling the external surface of an airfoil are: U.S. Pat. Nos. 2,149,510; 2,220,420; 2,489,683; and "Flight and Aircraft Engineer" No. 2460, Vol. 69, 3/16/56, pp. 292–295, all of which show the use of longitudinally extending slots for cooling either the leading edge or pressure and suction side airfoil surfaces. The slots shown therein extend completely through the airfoil wall to communicate directly with an internal cavity. Such slots are undesireable from a structural strength viewpoint; and they also require exceedingly large flow rates.

U.S. Pat. No. 4,303,374 shows a configuration for cooling the exposed, cut-back surface of the trailing edge of an airfoil. The configuration includes a plurality of longitudinally spaced apart, diverging passages within the trailing edge. Adjacent passages meet at their outlet ends to form a continuous film of cooling air over the cut-back surface.

A serial publication, "Advances in Heat Transfer" edited by T. F. Irvine, Jr. and J. P. Hartnett, Vol. 7, Academic Press (N.Y. 1971) includes a monograph titled *Film Cooling*, by Richard J. Goldstein, at pp. 321–379, which presents a survey of the art of film cooling. The survey shows elongated slots of different shapes extending entirely through the wall being cooled, and also passages of circular cross section extending through the wall.

DISCLOSURE OF INVENTION

One object of the present invention is an improved film cooling passage configuration for cooling a wall over which a hot gas stream is flowing.

Yet another object of the present invention is an airfoil film cooling passage which, in a short diffusing distance, is able to spread a small amount of coolant as a film over a large area of the airfoil external surface.

According to the present invention, a film cooling passage through a wall to be cooled has a metering section in series flow relation with a diffusing section leading to the passage outlet at the outer surface of the wall over which a hot gas is to flow, the diffusing section being generally rectangular in cross-section perpendicular to the flow of fluid therethrough and having diverging, spaced apart, oppositely facing side walls interconnecting an upstream surface of the diffusing section to an oppositely facing downstream surface of the diffusion section, the side walls blending, along their length, with the downstream surface as a smooth curve of large radius.

In this specification, including the appended claims, the "downstream surface" of the diffusing section is the surface of the diffusing section which faces generally upstream relative to the downstream direction of flow of hot gases over the passage outlet. The downstream surface intersects the outer surface of the wall to be cooled to define what is hereinafter referred to as the downstream edge of the passage outlet.

As discussed in the Background of the Invention, it has been a goal of the prior art to take a small amount of coolant fluid from the cool side of a wall to be cooled and to spread it out as a thin film over as large an area of the hot surface of the wall as possible. To do this, it is desirable to make the cooling passage outlet as long as possible in a direction perpendicular to the flow of hot gases over the surface at the passage outlet; and then the coolant fluid must uniformly (in the ideal case) fill the entire passage at the outlet so as to create a film of coolant downstream of the outlet which film is as wide as the outlet is long. The prior art teaches that diffusing the coolant flow from a small area inlet or metering section to a large area outlet necessitates the use of relatively small diffusion angles (i.e., less than 7°) to prevent separation from the diverging walls to assure that the coolant fluid fills the passage at the outlet. If one is limited to small diffusion angles, then long passage lengths are required to obtain large increases in passage outlet dimensions. When the wall to be cooled is thin, such as the wall of a hollow turbine airfoil, the maximum length of the passage is severely limited. Manufacturing limits and space limitations combined with passage length restrictions necessitates relatively large gaps between prior art passage outlets which translate into gaps in the coolant film produced by the passages.

In accordance with the present invention, it has been found, surprisingly, that substituting relatively large radius inside "corners" for prior art filet radii (i.e., sharp corners), where the diffusing section side walls join the downstream surface of the diffusing section, permits the use of more widely diverging side walls; that is, the round inside corners help fill the entire slot with coolant and prevent flow separation from the side walls when wide divergence angles are used. Divergence angles of up to 30° (60° included angle) have been successfully tested using passages configured according to the present invention.

The diameter of the corner curvature near the passage outlet should be on the same order as the distance between the upstream and downstream surfaces of the diffusing section at the location in question. In the typical case where the upstream and downstream surfaces diverge toward the passage outlet, the corner radius may be relatively small near the inlet to the diffusing section, increasing gradually to a maximum radius at the passage outlet. In one embodiment the corners each form a segment of an oblique cone.

It is believed that the rounded corners create counter rotating vortices along their length which pull coolant from the cohesive central core and redirect it toward the side walls as it travels through the diffusing section of the passage and moves toward the outlet. Separation of the flow from the side walls is thereby avoided for divergence angles significantly greater than those used in prior art passages, enabling complete filling of the more widely diverging passages with shorter passage length.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 6 is a sectional view taken along the line 6—6 of FIG. 4a.

BEST MODE FOR CARRYING OUT THE INVENTION

Figure 1:
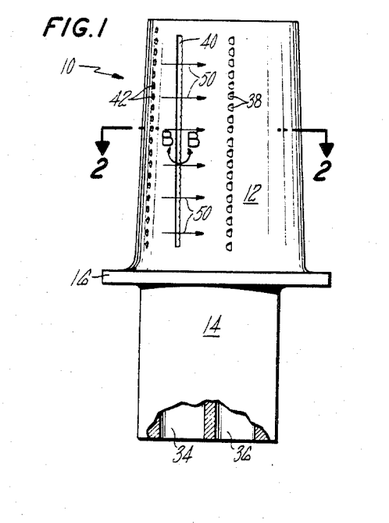
FIG. 1 is a hollow turbine blade, partly broken away, which incorporates the features of the present invention.
Figure 2:
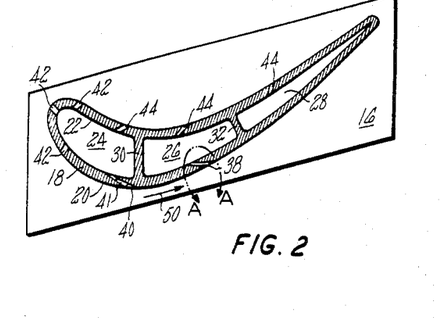
FIG. 2 is a sectional view taken along the line 2—2 of FIG. 1.

As an exemplary embodiment of the present invention consider the turbine blade of FIG. 1 generally represented by the reference numeral 10. With reference to FIGS. 1 and 2, the blade 10 comprises a hollow airfoil 12 which extends in a spanwise or longitudinal direction from a root 14 which is integral therewith. A platform 16 is disposed at the base of the airfoil 12. The airfoil 12 comprises a wall 18 having an outer surface 20 and an inner surface 22. The inner surface 22 defines a longitudinally extending internal cavity which is divided into a plurality of adjacent longitudinally extending compartments 24, 26, 28, respectively, by longitudinally extending ribs 30, 32. Passages 34, 36 within the root 14 communicate with the compartment 24, 26, and 28. When the blade 10 is operating in its intended environment, such as in the turbine section of a gas turbine engine, coolant pressure from a suitable source and air under, such as compressor bleed air, is fed into the passages 34, 36 and pressurizes the compartments 24, 26, 28.

As shown in FIGS. 1 and 2, the airfoil 12 includes a plurality of longitudinally extending rows of coolant passages, such as the passages 38 on the suction side; the passages 42 in the vicinity of the leading edge of the airfoil; and the passages 44 on the pressure side. Each passage 38, 42, 44 extends from an inlet at the inner surface 22 of the airfoil to an outlet at the outer surface 20. These passages need not be identical within a row or from row to row. The surface 20 of the suction side also includes a longitudinally extending slot 40, which is fed by a plurality of individual, longitudinally aligned passages 41 which extend to the inner surface 22. The airfoil shown in FIGS. 1 and 2 has been simplified for purposes of clarity, and the number of rows of passages, the number of passages in each row, and the spacing between rows, as shown in the drawing, is intended to be illustrative only and not limiting.

Figure 7:
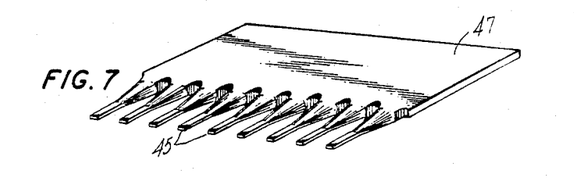
FIG. 7 is a perspective view of an electrode which can be used to simultaneously make a series of adjacent coolant passages similar to those described in FIGS. 3-6.

The coolant passages may be formed by any suitable means. A preferred method is by the well known technique of electro-discharge machining (EDM) using an electrode having the shape of the passage to be formed. A plurality of passages may be simultaneously formed using a "comb" electrode such as shown in FIG. 7, which is simply an electrode comprised of a plurality of adjacent "teeth" 45, each having the shape of the passage to be formed, and joined together at a common base 47. Another comb type electrode which could be used to form the passages of the present invention is described in commonly owned U.S. patent application Ser. No. 812,096 titled "Electrode for Machining Film Cooling Passages", by Robert E. Field, filed on even date herewith. The method for forming the passages is not considered to be an aspect of the present invention.

Throughout the drawing the arrows 50 represent the direction of flow (i.e., steamlines) of hot gases over the surface of the airfoil. For purposes of the description of the present invention, the direction of flow of hot gases over either the pressure or suction side surfaces of the airfoil shall be considered the downstream direction. Thus, at any point on the suction or pressure side surface of the airfoil, the downstream direction is tangent to the surface of the airfoil and, except, perhaps, close to the airfoil tip or the airfoil base where a typical currents are generated, is substantially perpendicular to the spanwise direction of the airfoil.

The improved coolant passages of the present invention are herein shown as the passages 38 disposed in a spanwise row through the suction side wall of the airfoil, and shown greatly enlarged in FIGS. 3 through 6. Although described as suction side coolant passages, their use is not limited to the suction side of the airfoil. It will be evident that the present invention is useful for cooling any relatively thin wall which has a pressurized compartment or chamber containing relatively cool fluid on one side of the wall and a hot fluid flowing over the surface of the other side of the wall which, in the area to be cooled, is at a lower pressure than the coolant fluid.

Referring to FIGS. 3-6, the passage 38 includes, in series flow relation, a metering section 52, followed by a diffusing section 56. In this embodiment, the metering section 52 is generally rectangular in cross-section; however, its specific cross-sectional shape is not critical to the present invention and may, for example, be circular or eliptical. By definition, the metering section 52 is that portion of the coolant passage 38 having the smallest cross-sectional area perpendicular to the direction of flow through the passage 38, which is along the passage centerline 39 which passes through the geometric center of the cross-sectional area of the metering section 52. The length B of the passage 38 is the length of the centerline 39 between the points where it intersects the surfaces 20, 22. In this specification, flow along the centerline 39 is in the "axial direction".

The metering section is preferably short in length to reduce the cohesiveness of the mass of coolant exiting therefrom. A length less than about 3.0 times the effective diameter of the cross-sectional area of the metering section is preferred. The shorter the length the better, as long as the metering section area is well defined. The inlet 58 to the metering section 52 communicates with the inlet 60 to the passage 38 at the inner surface 22 of the compartment 26 (FIG. 2) and receives a flow of coolant fluid therefrom.

The outlet 62 of the metering section 52 is coincident with the inlet to the diffusing section 56. The diffusing section 56 includes a pair of spaced apart flat surfaces 66, 68. The surface 68 is parallel to the spanwise or longitudinal direction of the airfoil. The surface 68 is also parallel to the centerline 39.

Figure 3:
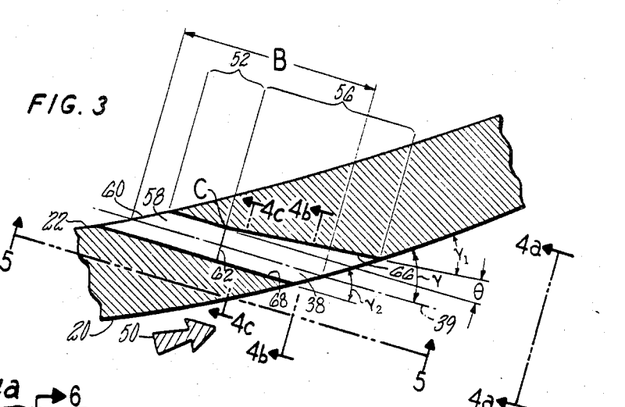
FIG. 3 is an enlarged view of the area A—A of FIG. 2 showing a cooling passage configured according to the present invention.

The surfaces 66, 68 extend generally downstream and intersect the outer surface 20 of the airfoil at angles $\gamma_1$, $\gamma_2$, respectively, (FIG. 3). These angles are preferably shallow angles of no more than about 40° (most preferably 30° or less), in order to minimize penetration of the coolant stream into the hot gas stream in a direction perpendicular to the outer surface of the airfoil. Excessive penetration can result in the coolant being immediately swept away from the surface of the airfoil as opposed to remaining attached to the surface of the airfoil as a film of coolant downstream of the passage outlet. The intersection of the surfaces 66, 68 with the outer surface 20 define downstream and upstream edges 73, 75, respectively, of the passage outlet 71; and for this reason the surfaces 66, 68 are referred to as the downstream surface and upstream surface, respectively. Note that the downstream surface 66 faces generally upstream, and upstream surface 68, faces generally downstream. To provide room for the large, curved corners discussed below it is required that the downstream surface 66 diverges from the centerline 39 toward the passage outlet 71. Preferably the downstream surface diverges from the upstream surface 68 by an angle of between 5° and 10°. This reduces the angle $\gamma_1$, which is desirable.

Figure 4A:
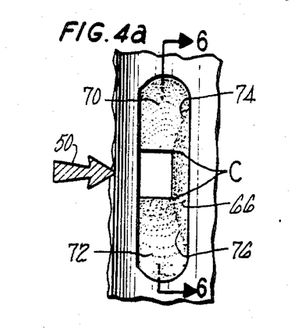
FIGS. 4(a), 4(b), and 4(c) are sectional views taken, respectively, along the lines 4(a)—4(a), 4(b)—4(b), and 4(c)—4(c) of FIG. 3.
Figure 4B:
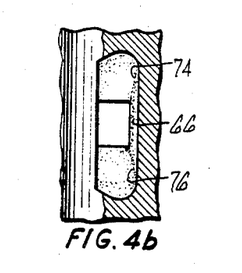
Figure 4C:
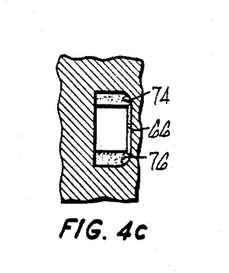
Figure 5:
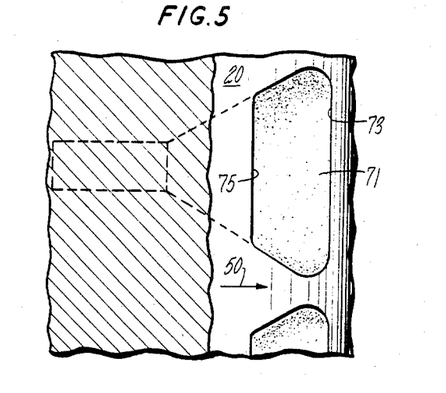
FIG. 5 is a sectional view taken along the line 5—5 of FIG. 3.
Figure 6:
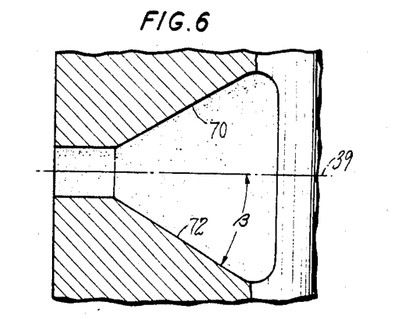

As best shown in FIGS. 4-6, the diffusing section 56 includes side surfaces 70, 72 which face each other and extend between the surfaces 66, 68. Each side surface also extends from the metering section outlet to the passage outlet along a straight path which diverges from the axial direction 39 by an angle $\beta$ (FIG. 6). Divergence angles $\beta$ of up to 30° have been tested successfully, wherein a coolant film was produced having a width substantially equivalent to the full width of the passage outlet, meaning that the passage flowed "full".

It is believed that with fine tuning divergence angles of up to 40° may be used.

Figure 12:
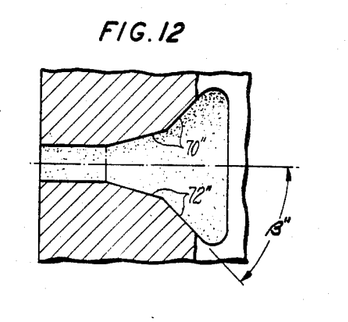
FIGS. 12 and 13 are schematic cross-sectional views, analogous to the view of FIG. 6, showing alternate configurations for coolant passages of the present invention.
Figure 13:
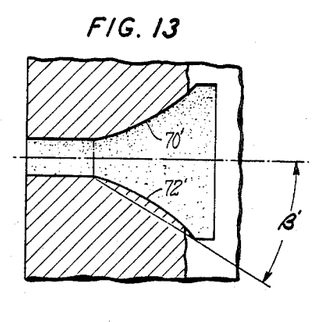

As shown schematically in FIGS. 12 and 13, respectively, the side surfaces may also be convexly curved (70', 72') or be comprised of a plurality of straight sections (70" or 72"), each diverging from the axial direction by a greater angle than the preceding section. The effective angle of divergence in each case is $\beta'$ and $\beta''$, respectively.

Referring to FIGS. 4a through 4c, each side surface 70, 72 blends (as at 74, 76) along its length with the downstream surface 66 as a smooth curve as opposed to a sharp corner or filet radius (see FIGS. 8-10 discussed below). Preferably the diameter of the curved corner at the outlet of the passage 38 (FIG. 4a) is on the order of the distance between the surfaces 66, 68 at the outlet. The diameter is reduced as the passage tapers down toward the diffusing section inlet. The corner preferably forms a segment of an oblique cone along the length of the diffusing section. The apexes of the cones are preferably located at points C (FIGS. 3, 4(a)).

Figure 8:
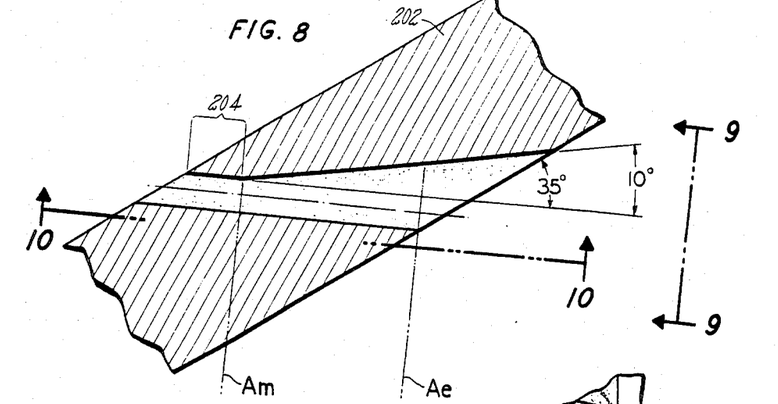
FIGS. 8-10 show the base line cooling passage configuration against which comparisons of the present invention may be made.
Figure 9:
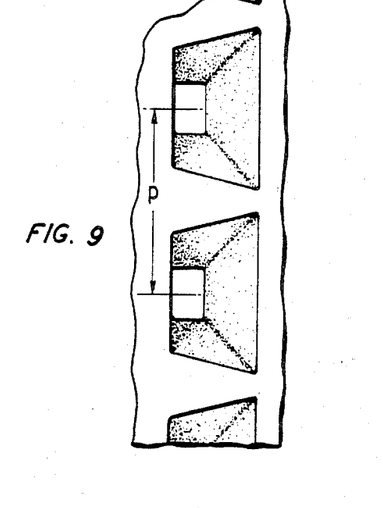
Figure 10:
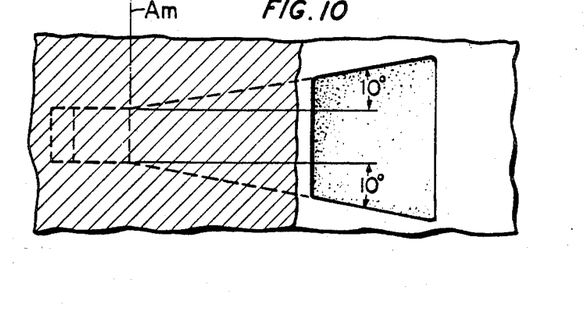

In prior art type passages such as shown in FIGS. 8-10 the coolant stream tends to remain a relatively cohesive, unidirectional mass which is difficult to redirect along the diverging surfaces 110, 112 of the diffusing section simply by viscous shear forces within the boundary layers. The smoothly curved corners of the present invention create counter rotating vortices which aid in uniformly filling the diffusing section with coolant, enabling the use of larger divergence angles $\beta$ than would otherwise be possible with the normal filet radii or sharp corners used by the prior art. The wider divergence angles of the passages of the present invention result in spreading the same amount of coolant over a significantly greater area than the prior art for the same passage length B (FIG. 3) and metering section cross-sectional area. This permits the use of coolant passages with small ratios of length (B) to metering section effective diameter (D), which is particularly advantageous when the wall to be cooled is very thin.

In small airfoils with thin walls (e.g., 0.030 inch thick), where the sum of the cross-sectional area of the metering sections of all the coolant passages is restricted, and the minimum size of each metering section is limited by practical considerations, the present invention permits the passage outlets of a spanwise row of passages to be more closely spaced from one another than if prior art passages were used.

In accordance with an alternate embodiment of the present invention, as shown in FIGS. 1, 16, 17, and 18, coolant passages 41 similar in shape to the passages 38 hereinabove described may be disposed sufficiently close together that their side surfaces 100 intersect below the outer surface 20 of the airfoil, thereby defining a longitudinally extending slot 40. With this arrangement, the coolant fluid from each passage 41 further diffuses within the slot 40 below the surface of the airfoil and exits as a continuous sheet along the length of the slot. This completely eliminates the gaps in coolant coverage which typically occur between logitudinally adjacent passages which break out at the surface as separate outlets, such as the passages 38 of the preceding embodiment.

For purposes of comparison, coolant passages according to the present invention were tested against a row of shaped passages as shown in FIGS. 8-10 herein referred to as the "baseline" configuration. These shaped passages are similar to the shaped passages described in Sidenstick, U.S. Pat. No. 4,197,443, except the divergence angles are 10°. In the tests described below these passages flowed "full" and produced a coolant film of substantially the same width as the passage outlet despite the teaching of Sidenstick which suggests maximum divergence angles of 7°.

Figure 11:
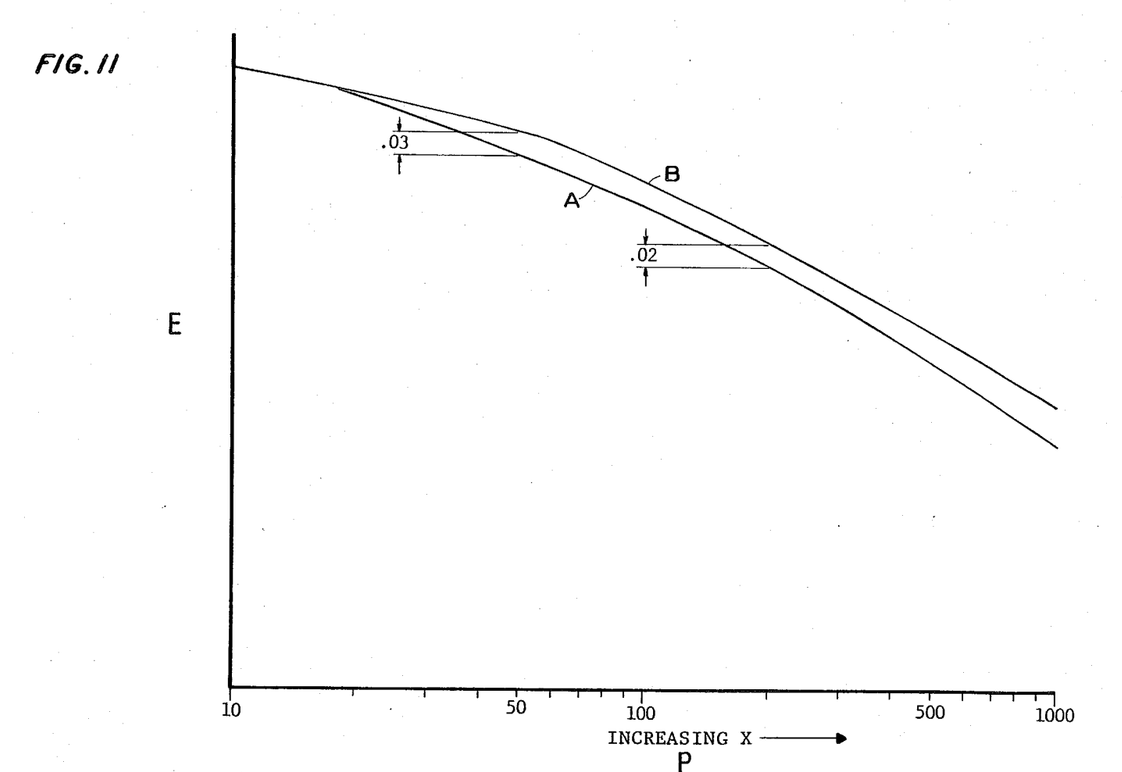
FIG. 11 is a graph which may be used to compare the film cooling effectiveness of a coolant passage configuration of the present invention to that of the base line configuration of FIGS. 8-10.

The graph of FIG. 11 shows the test results. In FIG. 11 the horizontal axis is a dimensionless parameter P whose value is the ratio of the distance "x" from the outlet of the cooling passage (in the direction of the mainstream gas flow over the outlet—i.e., in the downstream direction) to a number directly related to the mass flow rate of cooling air exiting the passage. The vertical axis is a measure of the film cooling effectiveness E (as hereinabove defined) measured at the distance x downstream of the passage outlet. The maximum possible cooling effectiveness is 1.0. Because P is directly related to distance from the passage outlet, and since the distance downstream of the outlet is the only variable in these tests, P may be considered as a measure of distance downstream of the passage outlet.

The curve labeled A is for a row of baseline coolant passages 200 through a test plate 202 such as shown in FIGS. 8–10. The area ratio $A_e/A_m$ for each passage was 3.6, where $A_e$ is the cross-sectional area of the passage outlet measured in the plane labeled $A_e$ in FIG. 8, and where $A_m$ is the cross-sectional area of the metering section 204 (FIG. 8) as measured in the plane labeled $A_m$. The pitch to diameter ratio, p/d, was 6.5, wherein p (FIG. 9) is the distance between the centers of adjacent metering sections 200, and d is the effective diameter of the metering section, which is the diameter of a circle having the same cross-sectional area $A_m2$.

The curve B is for a coolant configuration in a flat test plate similar to the coolant configuration formed by the passages 41 and slot 40 described with respect to FIGS. 1 and 16–18. Using the labels appearing in FIGS. 16 and 17, angle $\beta$ was 25°, angle $\theta$ was 10°, and angle $\gamma$ was 40°. The area ratio $A_e/A_m$ was 13.3 and the pitch to diameter ratio p/d was 5.77. $A_e$ and $A_m$ were measured in the planes having those designation in FIG. 17, which planes are perpendicular to the passage central axis. The slot 40 formed in the side of the test plate receiving the cooling fluid was intersected by passages whose diverging side surfaces intersected the side surfaces of adjacent passages just below the surface over which the hot gas was to flow. Thus, the passages formed a longitudinally extending slot along the hot surface of the test plate, analogous to the slot 40 shown in FIG. 1.

The improvement in film cooling effectiveness, E, provided by the present invention is significant and can readily be seen in FIG. 11. For example, at P=50 the present invention has a cooling effectiveness about 0.03 higher than that of the baseline shaped passages. At P=200 the difference in cooling effectiveness is about 0.02. To put this in perspective, assuming a coolant temperature at the slot outlet of 1200° F. and a mainstream gas temperature of 2600° F., a 0.02 increase in cooling effectiveness translates into about a 28° F. decrease in the temperature of the coolant film for the same mass flow rate of coolant.

It should also be noted that, since the coolant fluid completely filled the longitudinally extending slot at the passage outlets adjacent the hot surface of the test plate, the test configuration of the present invention provided a film of coolant which covered 100% of the longitudinal distance between the first and last passage. The configuration represented by curve A provided on the order of only 54% coverage.

Although the invention has been shown and described with respect to a preferred embodiment thereof, it should be understood by those skilled in the art that other various changes and omissions in the form and detail of the invention may be made without departing from the spirit and scope thereof.

I claim:

1. A cooled wall having an outer surface adapted to be exposed to a hot gas stream flowing in a downstream direction over said outer surface, and an inner surface adapted to define a portion of a coolant compartment for receiving coolant therein under pressure, a coolant passage within said wall, said passage having an outlet over which the hot gas flows in said downstream direction and including a metering section in series flow relation with a diffusing section, said diffusing section having an inlet and outlet, said metering section adapted to receive a flow of coolant from the coolant compartment and to control the rate of flow of coolant fluid through said passage, said diffusing section including an upstream surface spaced apart from and facing a downstream surface, said first and second surfaces being parallel to each other or diverging from each other toward said outer surface and intersecting said outer surface of said wall at a shallow angle to define said outlet of said coolant passage, said outer surface extending downstream of said passage outlet, said coolant passage being oriented to direct the flow of coolant from said passage outlet such that is has a component of velocity in the downstream direction and forms a film of coolant over said outer surface downstream of said passage outlet, said first surface forming an upstream edge of said passage outlet where it intersects with said outer wall and said second surface defining a downstream edge of said passage outlet where it intersects with said outer wall, said diffusing section including side surfaces facing each other, interconnecting said upstream and downstream surfaces and diverging from each other toward the outlet of said diffusing section, each of said side surfaces blending along substantially its full length with said downstream surface as a smooth curve having a diameter on the order of magnitude of the distance between said upstream and downstream surfaces at the location of said blending.

2. The cooled wall according to claim 1 wherein said metering section includes a straight section constructed and arranged to direct the flow of coolant into said diffusing section toward said passage outlet in a direction which is the axial direction, wherein at least one of said side surfaces diverges from said axial direction at an angle of at least 15°.

3. The cooled wall according to claim 2 wherein said smooth curve defines a segment of a cone.

4. The cooled wall according to claim 2 wherein both of said side surfaces diverge from said axial direction at an angle of at least 15°.

5. The cooled wall according to claim 4 wherein said metering section has an inlet at the inner surface of the said cooled wall and an outlet between said metering section inlet and said diffusing section, said metering section being a straight section from its inlet to its outlet.

6. The cooled wall according to claim 4 wherein said upstream and downstream edges of said passage outlet extend in a first direction substantially perpendicular to the downstream direction.

7. The cooled wall according to claim 5 wherein said axial direction is substantially parallel to said upstream surface, and said downstream surface diverges from said axial direction at an angle of up to about 10°.

8. The cooled wall according to claim 6 wherein said metering section has an outlet which is located at the inlet to said diffusing section, said metering section having a cross sectional area effective diameter "A", said metering section extending in said axial direction to said outlet for a distance no greater than about 3.0 "A".

9. The cooled wall according to claim 1 wherein said wall is the external wall of a hollow airfoil.

10. The cooled wall according to claim 8, wherein said wall is the external wall of a hollow airfoil, and said first direction is the spanwise direction of said airfoil.

11. The cooled airfoil wall according to claim 10, wherein said metering section extends in the axial direction from its inlet to its outlet.

12. The cooled wall according to claim 6 wherein said wall is the external wall of a hollow airfoil.

13. The cooled airfoil wall according to claim 12 including a plurality of said passages having their outlets spaced apart and substantially aligned in the spanwise direction of said airfoil.

14. The cooled airfoil wall according to claim 13 wherein said side surfaces of adjacent passages intersect each other below said outer surface, and said first and second surfaces of adjacent passages intersect said outer surface to define a continuous, spanwise extending slot.

* * * * *